(12) United States Patent
de Ganon et al.

(10) Patent No.: US 11,089,003 B2
(45) Date of Patent: Aug. 10, 2021

(54) BROWSER EXTENSION FOR LIMITED-USE SECURE TOKEN PAYMENT

(71) Applicant: Capital One Services, LLC, McLean, VA (US)

(72) Inventors: Matthew de Ganon, Hartsdale, NY (US); Kunal Arora, Great Falls, VA (US); Thomas Poole, Chantilly, VA (US); Daniel Kahn, San Francisco, CA (US); Dwij Trivedi, Oakton, VA (US); Paul Moreton, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/899,144

(22) Filed: Jun. 11, 2020

(65) Prior Publication Data

US 2020/0304486 A1 Sep. 24, 2020

Related U.S. Application Data

(63) Continuation of application No. 16/700,645, filed on Dec. 2, 2019, which is a continuation of application
(Continued)

(51) Int. Cl.
*G06Q 20/12* (2012.01)
*G06Q 20/38* (2012.01)
(Continued)

(52) U.S. Cl.
CPC ............ *H04L 63/08* (2013.01); *G06F 16/954* (2019.01); *G06F 21/31* (2013.01);
(Continued)

(58) Field of Classification Search
CPC .... G06Q 20/20; G06Q 20/208; G07G 1/0036; G07G 1/0045
(Continued)

(56) References Cited

U.S. PATENT DOCUMENTS 9,135,412 B1 9/2015 Talvensaari
2009/0234751 A1 9/2009 Chan
(Continued)

FOREIGN PATENT DOCUMENTS

EP 2332114 6/2011
WO WO 2010/017066 A2 2/2010

OTHER PUBLICATIONS

Communication and Search Report, issued from the European Patent Office in corresponding Application No. 20203928.5-1213, dated Nov. 19, 2020 (10 pages).

*Primary Examiner* — Edwyn Labaze
(74) *Attorney, Agent, or Firm* — Finnegan, Henderson, Farabow, Garrett & Dunner LLP

(57) ABSTRACT

Methods and systems for a browser extension system are disclosed. In some embodiments, a browser extension server includes a communication device configured to communicate with a first computing device executing a browser extension application and a web browser application and a second computing device executing an authentication application. The browser extension server further includes a memory storing instructions, and a processor configured to execute the instructions to perform operations. The operations may include receiving from the first computing device an indication of a financial service account associated with the first computing device, detecting a payment field in a web page provided by the computing device through the web browser application and, in response, generating a secure token mapped to the financial service account. The operations may further include sending the second computing device an authentication request, receiving an authentication response, and populating the payment field with the secure token.

20 Claims, 12 Drawing Sheets

Related U.S. Application Data

No. 15/381,070, filed on Dec. 15, 2016, now Pat. No. 10,498,717.

(60) Provisional application No. 62/267,996, filed on Dec. 16, 2015.

(51) Int. Cl.
| | | |
|---|---|---|
| *G06Q 20/40* | (2012.01) | |
| *H04L 29/06* | (2006.01) | |
| *G06F 16/954* | (2019.01) | |
| *G06F 21/62* | (2013.01) | |
| *G06F 21/31* | (2013.01) | |
| *G06F 40/174* | (2020.01) | |

(52) U.S. Cl.
CPC ........ *G06F 21/6263* (2013.01); *G06F 40/174* (2020.01); *G06Q 20/12* (2013.01); *G06Q 20/38215* (2013.01); *G06Q 20/4014* (2013.01); *H04L 63/1441* (2013.01); *H04L 63/168* (2013.01)

(58) Field of Classification Search
USPC .......................................... 235/383, 375, 487
See application file for complete search history.

(56) References Cited

U.S. PATENT DOCUMENTS

| | | |
|---|---|---|
| 2011/0189981 A1 | 8/2011 | Faith |
| 2012/0226772 A1 | 9/2012 | Grube |
| 2014/0281533 A1 | 9/2014 | De Andrade |
| 2014/0310172 A1 | 10/2014 | Grossman |
| 2014/0316981 A1 | 10/2014 | Muthukrishnan |
| 2014/0372319 A1 | 12/2014 | Wolovitz |
| 2015/0026057 A1 | 1/2015 | Calman |
| 2015/0304342 A1 | 10/2015 | Cheng |
| 2016/0057139 A1 | 2/2016 | McDonough |
| 2016/0094541 A1 | 3/2016 | Tan |
| 2016/0224977 A1 | 8/2016 | Sabba |
| 2016/0225065 A1* | 8/2016 | Govindaswamy ........................... G06Q 30/0601 |
| 2016/0301683 A1* | 10/2016 | Laxminarayanan ........................ G06Q 20/027 |
| 2017/0364914 A1 | 12/2017 | Howard |
| 2018/0089685 A1 | 3/2018 | McGregor |
| 2019/0147515 A1* | 5/2019 | Hurley ............... G06Q 30/0613 705/44 |

* cited by examiner

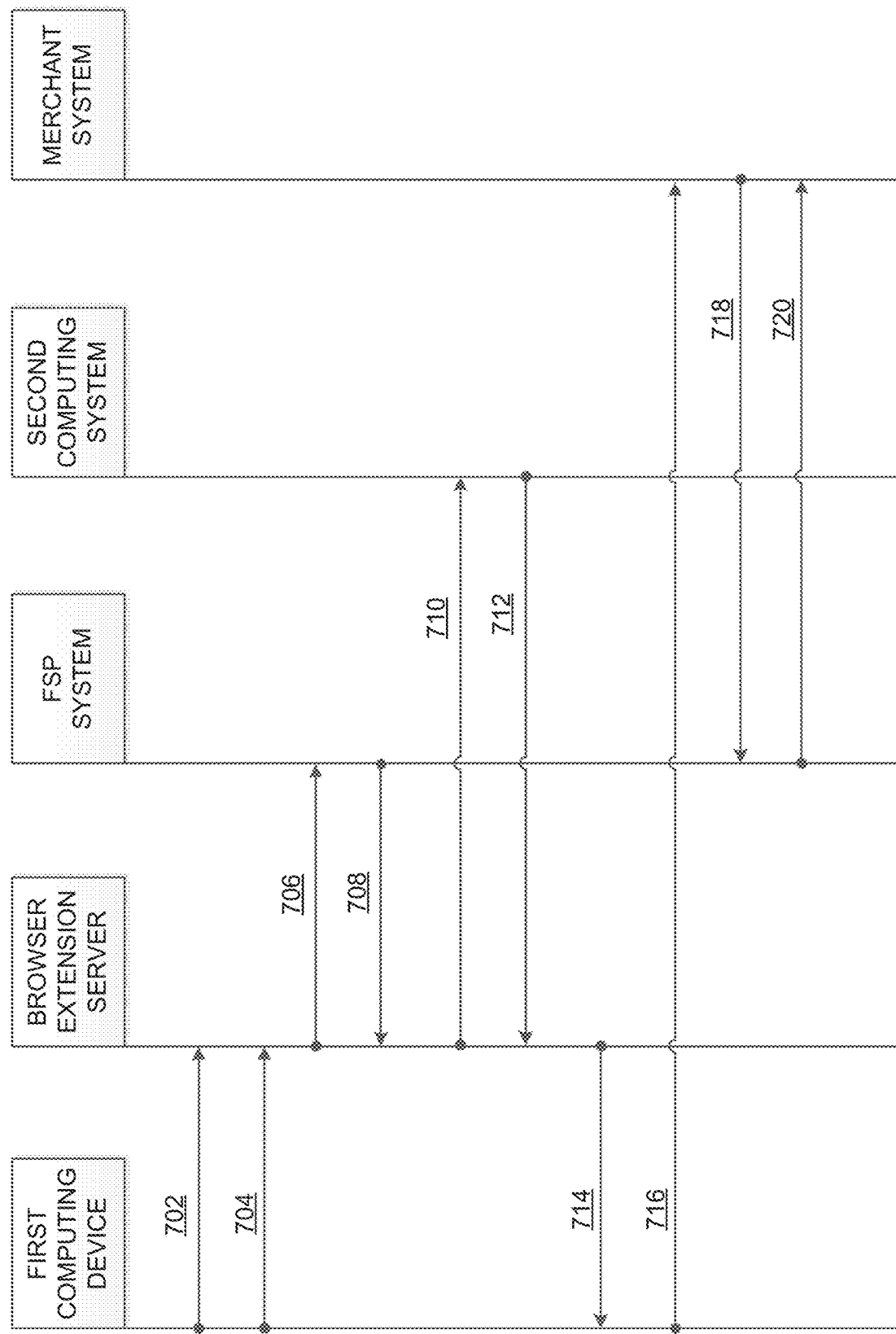

BROWSER EXTENSION FOR LIMITED-USE SECURE TOKEN PAYMENT

CROSS-REFERENCE TO RELATED APPLICATION

This application is a continuation of U.S. patent application Ser. No. 16/700,645, filed Dec. 2, 2019, which is a continuation of U.S. patent application Ser. No. 15/381,070, filed on Dec. 15, 2016, now U.S. Pat. No. 10,498,717, which claims priority to U.S. Provisional Patent Application Ser. No. 62/267,996 filed Dec. 16, 2015. The aforementioned applications are incorporated herein by reference in their entireties.

BACKGROUND

Many users access information on the Internet using software applications known as web browser applications. Web browser applications interpret the various languages in which information on the Internet is written, such as hypertext markup language (HTML) or an extensible markup language (XML), to provide the information to users in a user-readable format.

Some web pages may include one or more fields requiring population by a user. For example, a web page through which a user can purchase goods or services may include one or more fields to be populated with data to identify the user and/or provide payment for the goods or services.

Additional functionality may be added to web browsers by browser extension applications. A browser extension application is a software application made to be downloaded by a user and installed on the user's computing device to offer additional features to the browser. When the user accesses the Internet through a web browser application, the browser extension application provides the user with additionally functionality within the web browser application.

Some browser extension applications may be configured to automatically populate fields in a web page requiring population by a user. For example, a browser extension application may be configured to automatically populate fields with data identifying a user and/or providing payment.

Once data is populated into fields in a web page, a user may choose to submit the data through the web page. During both submission of the data itself and any downstream use of the data, the data may be vulnerable to interception, fraud, and/or corruption. Moreover, the authority of both the user and a recipient of the populated data to use the data is often indeterminate. For example, the recipient is not provided with any secondary authentication that the user is authorized to use the data for the populated purpose. And the user's intended scope for the recipient's authorization to use such data is unclear.

SUMMARY

The disclosed systems, methods, and media include a browser extension application configured to identify payment fields requiring population in web pages, generate secure tokens, and populate the fields with secure tokens. Unlike conventional browser extension applications, with which automatically populated data may be at risk of interception, fraud, and/or corruption during submission, with the disclosed browser extension application the submission of automatically populated data is secured through the use of secure tokens. By generating secure tokens mapped to data and populating fields with the secure tokens, rather than with unsecured data, the disclosed browser extension application avoids both the submission of the unsecured data and any downstream use of the unsecured data, thereby minimizing the risk of interception, fraud, and/or corruption faced by conventional browser extension applications. Moreover, while with conventional browser extension applications the authority of a both a user and a recipient to use populated data is often uncertain, the disclosed browser extension application, which enables authentication of a user through a second computing device prior to use of secure tokens, ensures that a user has authority to use the populated data. And the secure token itself limits the recipient's use of the populated data to the user's intended purpose. In these and other manners, the disclosed browser extension application represents an improvement over conventional browser extension applications.

In one embodiment, a browser extension server is disclosed. The browser extension server may comprise a communication device configured to communicate with a first computing device executing a browser extension application and a web browser application, and with a second computing device executing an authentication application. The browser extension server may further include a memory storing instructions and a processor configured to execute the instructions to perform operations. The operations may comprise receiving from the first computing device, through the browser extension application, an indication of a financial service account associated with the first computing device. The operations may further comprise detecting, through the browser extension application, a payment field in a web page provided by the first computing device through the web browser application. The operations may still further comprise, in response to detecting the payment field, generating a secure token mapped to the financial service account and transmitting to the second computing device, through the authentication application, an authentication request. The operations may further comprise, in response to transmitting the authentication request, receiving from the second computing device, through the authentication application, an authentication response. The operations may still further comprise, in response to determining that the authentication response satisfies the authentication request, populating the payment field with the secure token through the browser extension application.

In another embodiment, a method is disclosed. The method may comprise receiving, through a browser extension application executed at a first computing device, an indication of a financial service account associated with the first computing device. The method may further comprise detecting, through the browser extension application, a payment field in a web page provided by the first computing device through a web browser application. The method may still further comprise, in response to detecting the payment field, generating a secure token mapped to the financial service account and transmitting to a second computing device, through an authentication application executed at the second computing device, an authentication request. The method may further comprise, in response to transmitting the authentication request, receiving from the second computing device, through the authentication application, an authentication response. The method may still further comprise, in response to determining that the authentication response satisfies the authentication request, populating the payment field with the secure token through the browser extension application.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 7 is a flowchart of a browser extension message stream, consistent with disclosed embodiments.

DETAILED DESCRIPTION

Reference will now be made in detail to the disclosed embodiments, examples of which are illustrated in the accompanying drawings.

The contents of U.S. patent application Ser. No. 14/827,671, filed Aug. 17, 2015, and U.S. patent application Ser. No. 14/827,608, filed Aug. 17, 2015, are hereby incorporated by reference in their entirety.

Figure 1:
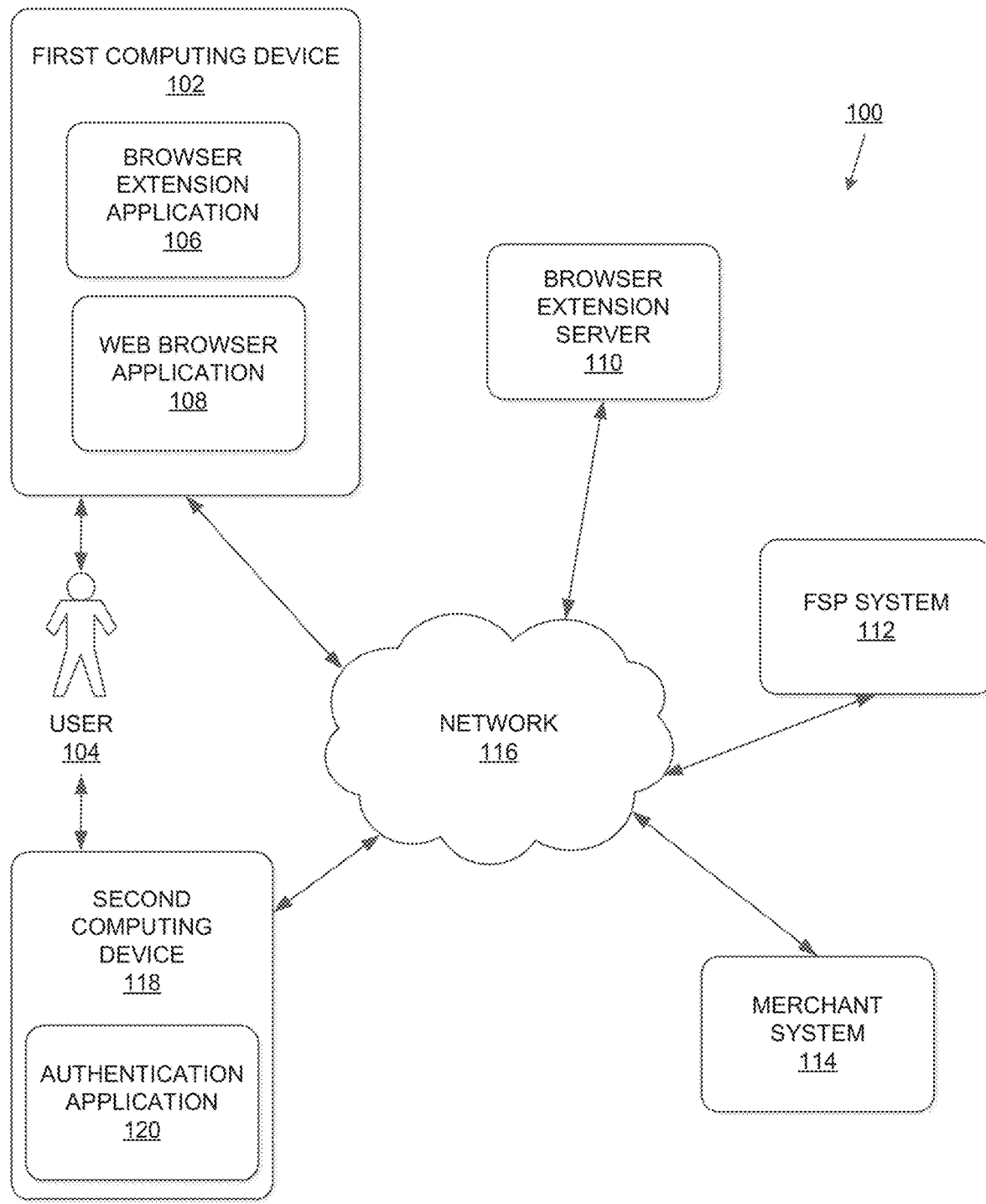
FIG. 1 is a block diagram of an exemplary system, consistent with disclosed embodiments.

FIG. 1 is a block diagram of an exemplary system 100, consistent with disclosed embodiments. System 100 may be configured for performing a browser extension process consistent with disclosed embodiments.

As shown, system 100 may include first computing device 102 associated with a user 104. First computing device 102 may be configured to execute, among other programs, a browser extension application 106 and a web browser application 108. System 100 may further include a browser extension server 110, a financial service provider (FSP) system 112, and a merchant system 114. As shown, first computing device 102, browser extension server 110, FSP system 112, and merchant system 114 may be communicatively coupled by a network 116. In some embodiments, system 100 may further include second computing device 118 associated with user 104 and/or another user. Second computing device 118 may be configured to execute, among other programs, an authentication application 120. Second computing device 120 may be communicatively coupled to one or more of first computing device 102, browser extension server 110, FSP system 112, and merchant system 114 by network 116.

While only one first computing device 102, browser extension server 110, FSP system 112, merchant system 114, network 116, and second computing device 118 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

First computing device 102 may be one or more computing devices configured to perform operations consistent with executing browser extension application 106 and with executing web browser application 108. First computing device 102 is further described below in connection with FIG. 3A.

Browser extension application 106 may be one or more software applications configured to perform operations consistent with detecting fields in web pages, such as payment fields in web pages associated with merchants. Browser extension application 106 may be further configured to perform operations consistent with populating fields in web pages with, for example, secure tokens mapped to financial service accounts. Browser extension application 106 is further described below in connection with FIGS. 2 and 3A.

A secure token may be a generated identifier that maps back to an identifier of underlying data. For example, in the case of a secure token mapped to a financial service account, the secure token may be a generated identifier that maps back to a primary account number (PAN) (e.g., a 16-digit PAN often printed on a financial service product such as a credit card) or other identifier. The secure token identifier may be, for example, a randomly generated identifier. The secure token identifier may be nonreversible, such that the underlying data cannot be discovered through decryption of the secure token. Only an authorized recipient, seeking to access the underlying data where it is stored, can gain access to the underlying data.

Web browser application 108 may be one or more software applications configured to perform operations consistent with providing web pages, such as web pages associated with merchants. The web pages may include payment fields. Web browser application 108 is further described below in connection with FIG. 3A.

Second computing device 118 may be one or more computing devices configured to perform operations consistent with executing authentication application 120. Second computing device 118 is further described below in connection with FIG. 3B.

Browser extension server 110 may be one or more computing devices configured to perform operations consistent with providing browser extension application 106. Browser extension server 110 may be further configured to perform operations consistent with generating secure tokens mapped to financial service accounts. In some embodiments, browser extension server 110 may be further configured to perform operations consistent with providing authentication application 120. Browser extension server 110 is further described below in connection with FIG. 2.

FSP system 112 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

FSP system 112 may be one or more computing devices configured to perform operations consistent with maintaining financial service accounts, including a financial service account associated with user 104. FSP system 112 may be further configured to authenticate financial transactions associated with such financial service accounts. In particular, FSP system 112 may be configured to authenticate financial transactions associated with a financial service account associated with user 104. In some embodiments, FSP system 112 may be further configured to generate content for a display device included in, or connected to, first computing device 102 and/or second computing device 118, such as through a mobile banking or other application on first computing device 102 and/or second computing device 118. Alternatively or additionally, FSP system 112 may be configured to provide content through one or more web pages or online portals that are accessible by first computing device 102 and/or second computing device 118 over network 116. The disclosed embodiments are not limited to any particular configuration of FSP system 112.

While browser extension server 110 and FSP system 112 are shown separately, in some embodiments browser extension server 110 may include or be otherwise related to FSP system 112. For example, in some embodiments the facility of browser extension server 110 may be provided instead by FSP system 112, or vice versa. As another example, in some embodiments, rather than browser extension server 110 being configured to perform operations consistent with providing authentication application 120, system 100 may further include an authentication server configured to perform such operations. Alternatively or additionally, in some embodiments, browser extension server 110 may be included in, and/or be otherwise related to, any other entity in system 100 and/or a third-party not shown in system 100. Alternatively or additionally, browser extension server 110 may be a standalone server. Browser extension server 110 may take other forms as well.

Merchant system 114 may be one or more computing devices configured to perform operations consistent with providing web pages that are accessible by first computing device 102 over network 116. For example, the web pages may be provided at first computing device 102 through web browser application 108. In some embodiments, merchant system 114 may be associated with a merchant that provides goods or services. Further, in some embodiments, the web pages may be online retail web pages through which user 104 may engage in purchase transactions to purchase the merchant's goods or services. Other web pages are possible as well. The disclosed embodiments are not limited to any particular configuration of merchant system 114. In some embodiments, merchant system 114 may be one or more other third-party systems configured to provide web pages that are accessible by computing device 102 over network 116.

Network 116 may be any type of facility configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
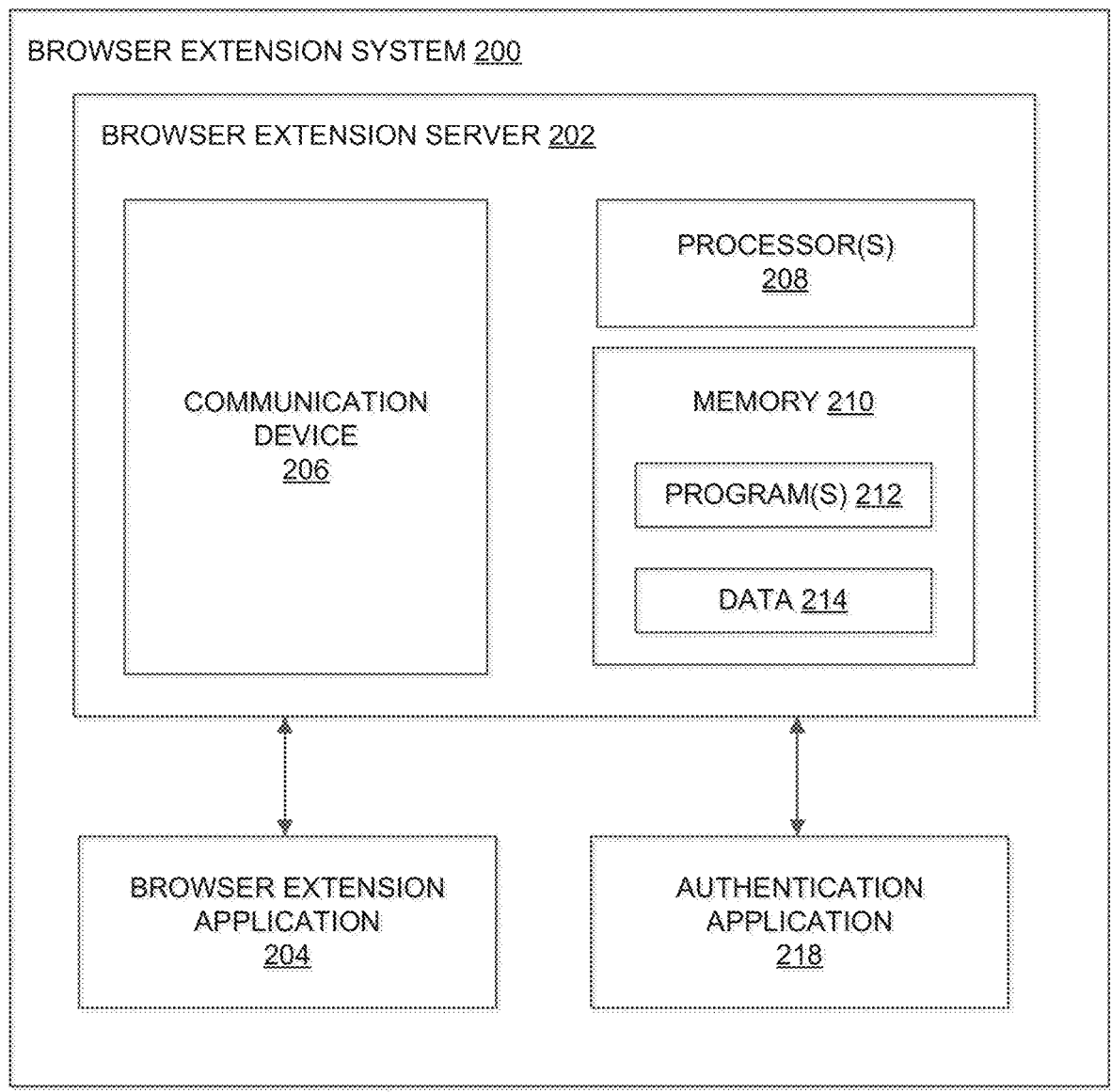
FIG. 2 is a block diagram of an exemplary browser extension system, consistent with disclosed embodiments.

FIG. 2 is a block diagram of an exemplary browser extension system 200, consistent with disclosed embodiments. As shown, browser extension system 200 may include browser extension server 202 and a browser extension application 204. Browser extension server 202, which may, for example, take the form of browser extension server 110 described above, may include a communication device 206, one or more processor(s) 208, and memory 210 including one or more programs 212 and data 214. Browser extension server 202 may be configured to perform operations consistent with providing browser extension application 204.

In some embodiments, browser extension system 200 may further include an authentication application 218. Browser extension server 202 may be further configured to perform operations consistent with providing authentication application 218. Alternatively, in some embodiments, browser extension system 200 may further include an authentication server (not shown) configured to perform operations consistent with providing authentication application 218.

Browser extension server 202 may take the form of a server, general purpose computer, mainframe computer, or any combination of these components. Other implementations consistent with disclosed embodiments are possible as well. Browser extension application 204 may take the form of one or more software applications stored on a computing device, such as browser extension application 106 stored on first computing device 102 described above. Authentication application 218 may take the form of one or more applications stored on a computing device, such as authentication application 120 stored on second computing device 118 described above.

Communication device 206 may be configured to communicate with one or more computing devices, such as first computing device 102 and/or second computing device 118 described above. In some embodiments, communication device 206 may be configured to communicate with the computing device(s) through browser extension application 204 and/or authentication application 218. In particular, in some embodiments, browser extension server 202 may be configured to receive, through browser extension application 204 and communication device 206, an indication of a financial service account associated with a first computing device. Further, in some embodiments, browser extension server 202 may be configured to detect, through browser extension application 204 and communication device 206, a payment field in a web page provided by the first computing device through a web browser application. Still further, in some embodiments, browser extension server 202 may be configured to transmit, through authentication application 218, an authentication request to a second computing device. Further, in some embodiments browser extension server 202 may be configured to receive, through authentication application 218, an authentication response from the second computing device. Further, in some embodiments, browser extension server 202 may be configured to populate, through the browser extension application 204, the payment field with a secure token generated by the browser extension server 202. Communication device 206 may be configured to communicate with the computing device(s) in other manners as well.

Communication device 206 may be further configured to communicate with one or more FSP systems, such as FSP system 112 described above. In some embodiments, the FSP system may provide a financial service account associated with a computing device, and communication device 206 may be configured to communicate with one or more other entities, such as the FSP system(s), to generate a secure token. For example, communication device 206 may be configured to communicate with the FSP system(s) to generate a secure token mapped to the financial service account associated with the computing device. Communication device 206 may be configured to communicate with the other entities in other manners.

Communication device 206 may be configured to communicate with other components as well. For example, in embodiments where browser extension system 200 includes an authentication server, as discussed above, communication device 206 may be further configured to communicate with the authentication server. In general, communication device 206 may be configured to provide communication over a network, such as network 116 described above. To this end, communication device 206 may include, for example, one or more digital and/or analog devices that allow browser extension system 200 to communicate with and/or detect other components, such as a network controller and/or wireless adaptor for communicating over the Internet. Other implementations consistent with disclosed embodiments are possible as well.

Processor(s) 208 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of browser extension system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. The disclosed embodiments are not limited to separate programs or computers configured to perform dedicated tasks. For example, memory 210 may include a single program 212 that performs the functions of browser extension system 200, or program(s) 212 may comprise multiple programs. Memory 210 may also store data 214 that is used by program(s) 212.

In certain embodiments, memory 210 may store sets of instructions for carrying out the processes described below in connection with FIG. 4. Other instructions are possible as well. In general, instructions may be executed by processor(s) 208 to perform one or more processes consistent with disclosed embodiments.

The components of browser extension system 200 may be implemented in hardware, software, or a combination of both hardware and software, as will be apparent to those skilled in the art. For example, although one or more components of browser extension system 200 may be implemented as computer processing instructions, all or a portion of the functionality of browser extension system 200 may be implemented instead in dedicated electronics hardware.

In some embodiments, browser extension system 200 may also be communicatively connected to one or more database(s) (not shown). Alternatively, such database(s) may be located remotely from browser extension system 200. Browser extension system 200 may be communicatively connected to such database(s) through a network, such as network 116 described above. Such database(s) may include one or more memory devices that store information and are accessed and/or managed through browser extension system 200. By way of example, such database(s) may include Oracle™ databases, Sybase™ databases, or other relational databases or non-relational databases, such as Hadoop® sequence files, HBase™, or Cassandra™. Such database(s) may include computing components (e.g., database management system, database server, etc.) configured to receive and process requests for data stored in memory devices of the database(s) and to provide data from the database(s).

Figure 3A:
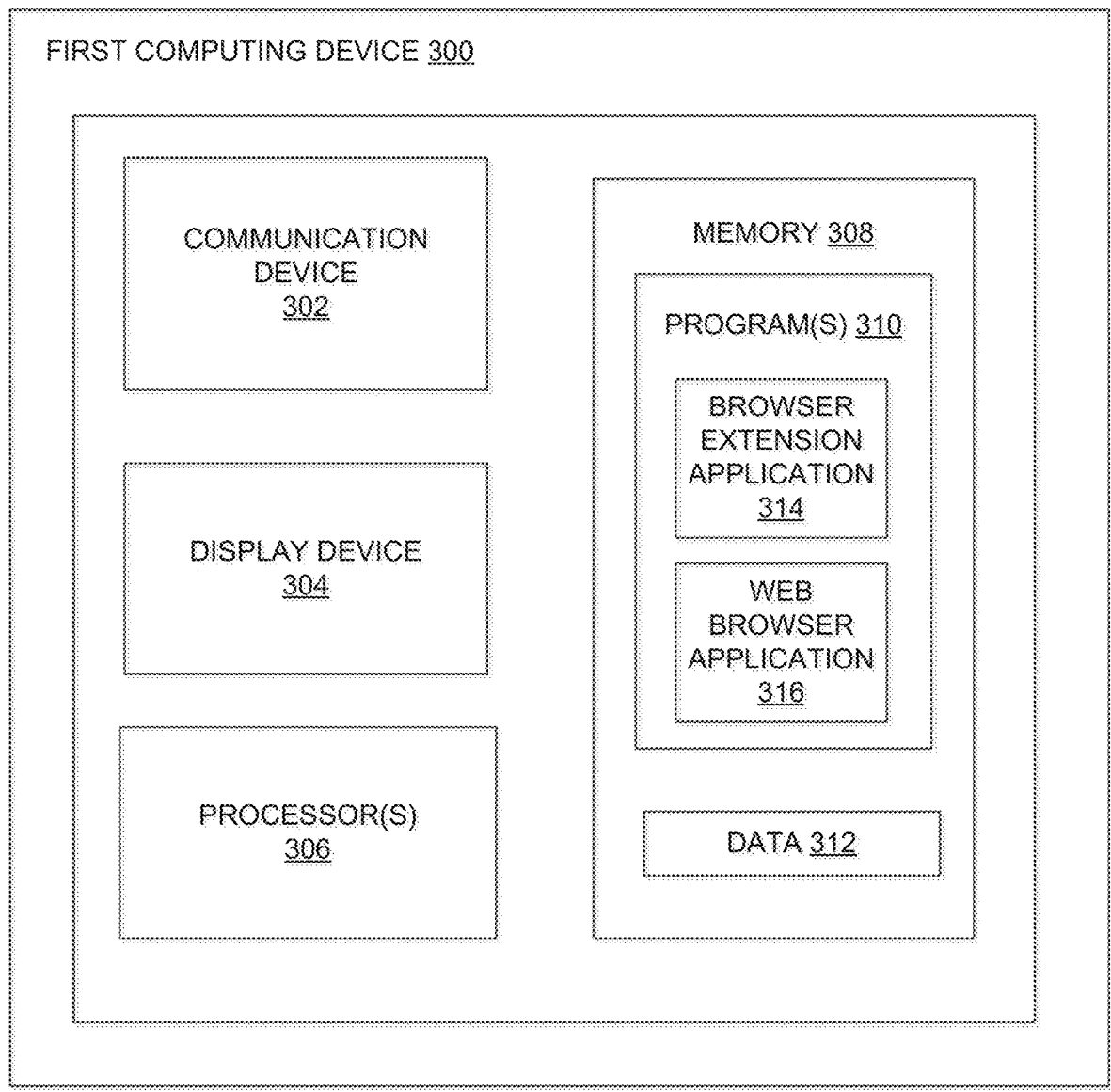
FIGS. 3A-B are block diagrams of exemplary computing devices, consistent with disclosed embodiments.

FIG. 3A is a block diagram of an exemplary first computing device 300, consistent with disclosed embodiments. First computing device 300 may, in some embodiments, be similar to first computing device 102 described above. As shown, first computing device 300 may include a communication device 302, a display device 304, processor(s) 306, and memory 308 including program(s) 310 and data 312. Program(s) 310 may include, among others, a browser extension application 314 and a web browser application 316.

In some embodiments, first computing device 300 may take the form of a desktop or mobile computing device, such as a desktop computer, laptop computer, smartphone, tablet, or any combination of these components. Alternatively, first computing device 300 may be configured as any wearable item, including jewelry, smart glasses, or any other device suitable for carrying or wearing on a customer's person. Other implementations consistent with disclosed embodiments are possible as well. First computing device 300 may, for example, be similar to first computing device 102 described above.

Communication device 302 may be configured to communicate with a browser extension server, such as browser extension servers 110 and 202 described above. For example, communication device 302 may be configured to provide to the browser extension server an indication of a financial service account associated with the first computing device 300. Communication device 302 may provide the indication through, for example, the browser extension application 314. As another example, communication device 302 may be configured to receive from the browser extension server a secure token mapped to the financial service account. Communication device 302 may receive the secure token through, for example, the browser extension application 314. Other examples are possible as well.

In some embodiments, communication device 302 may be further configured to communicate with one or more merchant systems, such as merchant system 114 described above, and/or one or more FSP systems, such as FSP system 112 described above. For example, communication device 302 may be configured to provide the secure token to the merchant system. Other examples are possible as well. Communication device 302 may be configured to communicate with other components as well.

Communication device 302 may be configured to provide communication over a network, such as network 116 described above. To this end, communication device 302 may include, for example, one or more digital and/or analog devices that allow first computing device 300 to communicate with and/or detect other components, such as a network controller and/or wireless adaptor for communicating over the Internet. Other implementations consistent with disclosed embodiments are possible as well.

Display device 304 may be any display device configured to display interfaces on first computing device 300. The interfaces may include, for example, web pages provided by first computing device 300 through web browser application 116. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with first computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of first computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of first computing device 300, or program(s) 310 may comprise multiple programs. Memory 308 may also store data 312 that is used by program(s) 310.

In some embodiments, program(s) 310 may include a browser extension application 314. Browser extension application 314 may be executable by processor(s) 306 to perform operations including, for example, providing to a browser extension server, such as browser extension servers 110 and 202 described above, an indication of a financial service account associated with first computing device 300 and receiving from the browser extension server a secure token mapped to the financial service account. Browser extension application 314 may be executable by processor(s) 306 to perform other operations as well.

In some embodiments, program(s) 310 may further include a web browser application 316. The web browser application may be executable by processor(s) 306 to perform operations including, for example, providing web pages for display. The web pages may be provided, for example, via display device 304. In some embodiments, the web pages may be associated with a merchant system, such as merchant system 114 described above. Web browser application 316 may be executable by processor(s) 306 to perform other operations as well.

In certain embodiments, memory 308 may store sets of instructions for carrying out the processes described below in connection with FIG. 5. Other instructions are possible as well. In general, instructions may be executed by processor(s) 306 to perform one or more processes consistent with disclosed embodiments.

The components of first computing device 300 may be implemented in hardware, software, or a combination of both hardware and software, as will be apparent to those skilled in the art. For example, although one or more components of first computing device 300 may be implemented as computer processing instructions, all or a portion of the functionality of first computing device 300 may be implemented instead in dedicated electronics hardware.

Figure 3B:
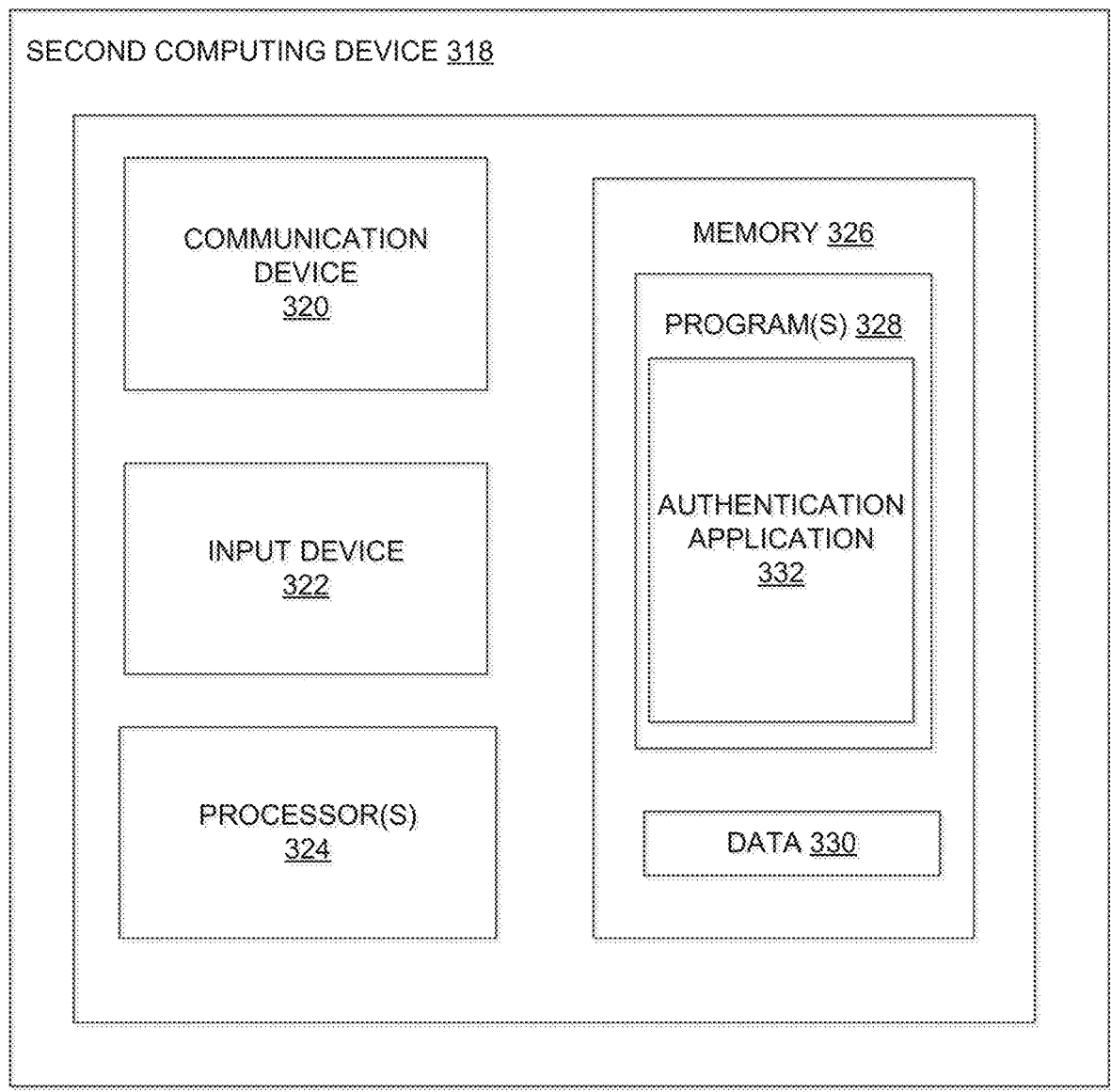

FIG. 3B is a block diagram of an exemplary second computing device 318, consistent with disclosed embodiments. Second computing device 318 may, in some embodiments, be similar to second computing device 118 described above. As shown, second computing device 318 may include a communication device 320, an input device 322, processor(s) 324, and memory 326 including program(s) 328 and data 330. Program(s) 328 may include, among others, an authentication application 332.

Second computing device 318 may take any of the forms described above in connection with first computing device 300. Computing device 318 may, for example, be similar to second computing device 118 described above.

Communication device 320 may be configured to communicate with a browser extension server, such as browser extension servers 110 and 202 described above. For example, communication device 320 may be configured to receive from the browser extension server an authentication request. Communication device 320 may receive the authentication request through, for example, authentication application 332. As another example, communication device 320 may be configured to transmit to the browser extension server an authentication response. Communication device 320 may authentication response through, for example, authentication application 332. Other examples are possible as well.

In some embodiments, communication device 320 may be further or alternatively configured to communicate with an authentication server. For example, communication device 320 may be configured to receive an authentication request from and/or transmit an authentication response to an authentication server through, for instance, authentication application 332. Communication device 320 may be configured to communicate with other components as well.

Communication device 320 may be configured to provide communication over a network, such as network 116 described above. To this end, communication device 320 may take any of the forms described above in connection with communication device 302.

Input device 322 may be any display device configured to receive input from a user of the second computing device 318. To this end, input device 322 may be configured to display interfaces on second computing device 318. The interfaces may include, for example, interfaces prompting the user to provide an input, for instance, in response to receipt of an authentication request. In some embodiments, input device 322 may include a screen for displaying a graphical and/or text-based user interface, including but not limited to, liquid crystal displays (LCD), light emitting diode (LED) screens, organic light emitting diode (OLED)

screens, and other known input devices. In some embodiments, input device 322 may also include one or more digital and/or analog devices that allow a user to provide input to the second computing device 318, such as a touch-sensitive area, keyboard, buttons, or microphones. Other input devices are possible as well. The disclosed embodiments are not limited to any type of input devices otherwise configured to receive input from a user.

Processor(s) 324 may take any of the forms described above in connection with processor(s) 306. The disclosed embodiments are not limited to any type of processor(s) otherwise configured to meet the computing demands required of different components of second computing device 318.

Memory 326 may include one or more storage devices configured to store instructions used by processor(s) 324 to perform functions related to disclosed embodiments. For example, memory 326 may be configured with one or more software instructions, such as program(s) 328, that may perform one or more operations when executed by processor(s) 324. The disclosed embodiments are not limited to separate programs or computers configured to perform dedicated tasks. For example, memory 326 may include a single program 328 that performs the functions of second computing device 318, or program(s) 328 may comprise multiple programs. Memory 326 may also store data 330 that is used by program(s) 328.

In some embodiments, program(s) 328 may include authentication application 332. The authentication application 332 may be executable by processor(s) 324 to perform operations including, for example, receiving from a browser extension server, such as browser extension servers 110 and 202 described above, an authentication request and transmitting to the browser extension server an authentication response. The authentication application 332 may be executable by processor(s) 324 to perform other operations as well.

The components of second computing device 318 may be implemented in any of the manners described above in connection with first computing device 300.

Figure 4:
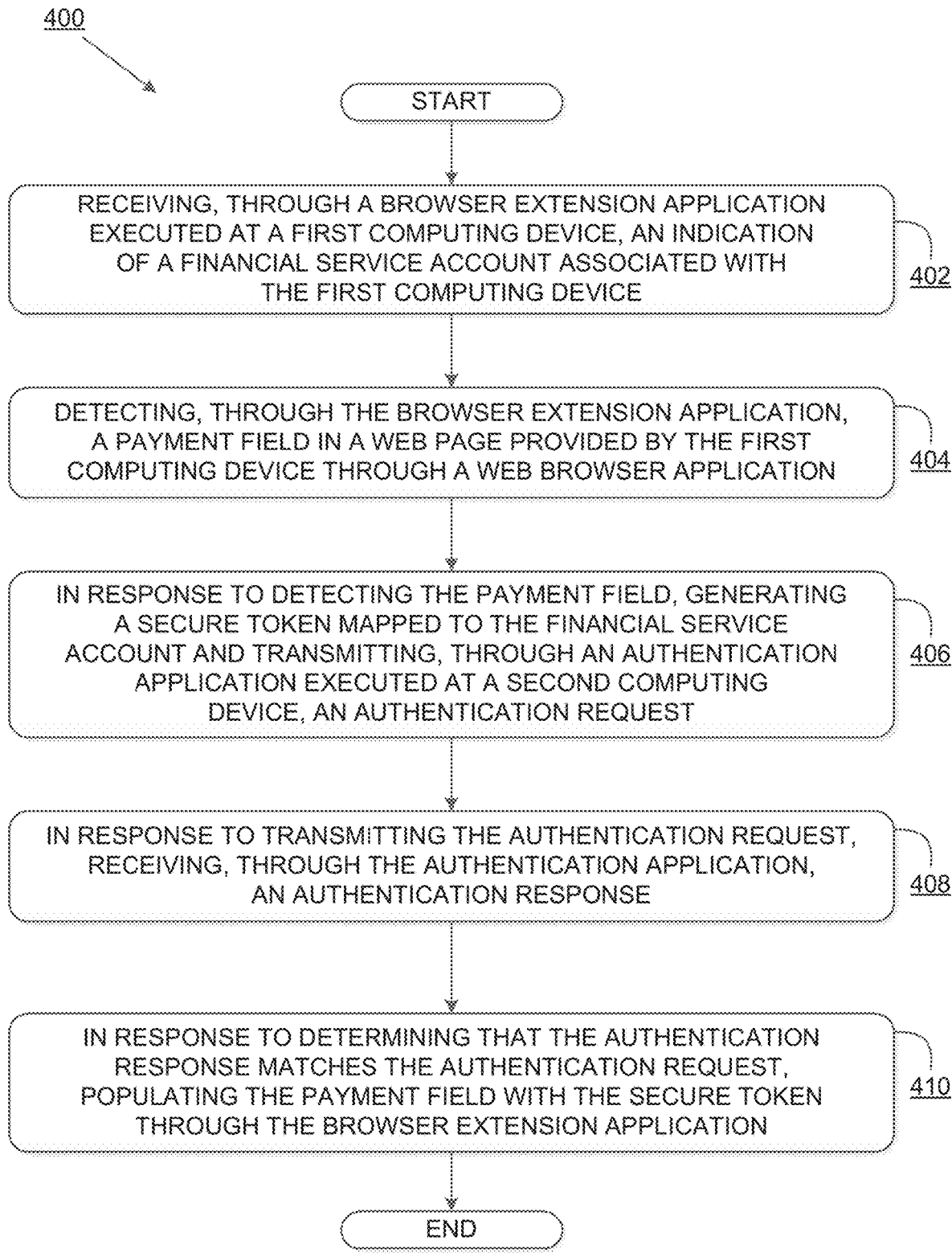
FIG. 4 is a flowchart of an exemplary browser extension process, consistent with disclosed embodiments.

FIG. 4 is a flowchart of an exemplary browser extension process 400, consistent with disclosed embodiments. Browser extension 400 may be carried out by a browser payment server, such as browser extension servers 110 and 200 described above, and/or a browser extension application, such as browser extension applications 106, 204, and 314 described above.

As shown in FIG. 4, browser extension process 400 begins at step 402 with receiving, through a browser extension application executed at a first computing device, an indication of a financial service account associated with the first computing device. The financial service account may be, for example, an account provided by a financial service provider, such as FSP system 112 described above. The financial service account may be one of, for example, a credit card account, a loan accounts, a checking account, a savings account, and a reward or loyalty program account. The financial service account may take other forms as well. The indication of the financial service account may be, for example, a PAN (e.g., a 16-digit PAN often printed on a financial service product), routing information, or other identifier of a financial service account. The indication of the financial service account may take other forms as well. In some embodiments, user 104 may operate first computing device 102 to provide the indication such that web browser application 108 and/or browser extension server 110 may subsequently coordinate with FSP system 112 to generate and provide a secure token mapped to the underlying financial service account, as described below.

Browser extension process 400 continues at step 404 with detecting, through the browser extension application, a payment field in a web page provided by the first computing device through a web browser application. In some embodiments, the browser extension application may be configured to, for example, review the script (e.g., HTML, XML) of the web page for input fields associated with payment. For instance, the browser extension application may review input field identifiers for input fields in the script to search for identifiers pertaining to payment. Upon detecting the payment field, the browser extension application may provide to the browser extension server an indication of the payment field. The browser extension application and/or browser extension server may detect the payment field in other manners as well.

In some embodiments, in response to detecting the payment field, the browser extension server and/or browser extension application may visually highlight the payment field. For example, the payment field may be visually highlighted on the web page using color, font, pop-ups, and/or graphics. Other examples are possible as well.

Browser extension process 400 continues at step 406 where, in response to detecting the payment field, the browser extension server generates a secure token mapped to the financial service account and transmits, through an authentication application executed at a second computing device, an authentication request. The secure token may be generated by the browser extension application and/or browser extension server. In some embodiments, the browser extension application and/or browser extension server may interact with one or more other entities in generating the secure token. For example, the browser extension application may store the provided indication of the financial service account and generate the secure token, which may be mapped to the indication of the financial service account stored at the browser extension application. Alternatively, in some embodiments, the browser extension server may populate the at least one field by identifying the indication of the financial service account maintained at the browser extension server and generating the secure token, which may be mapped to the indicated data stored at the browser extension server.

The secure token may be a generated identifier that maps back to an identifier of the financial service account, such as a primary account number (PAN) (e.g., a 16-digit PAN often printed on a financial service product) or other identifier. The secure token identifier may be, for example, a randomly generated identifier. In some embodiments, the browser extension server may generate the secure token in connection with one or more other entities. For example, the browser extension server may generate the secure token in connection with a financial service provider providing the financial service account and/or one or more other entities. For example, the browser extension server may provide the secure token and/or information associated with the secure token (e.g., a decryption token) to the financial service provider. The browser extension server may generate the secure token in other manners as well.

In some embodiments, the secure token may map directly (that is, without any intermediary) to the financial service account. In these embodiments, when a secure token is provided to a merchant, the merchant may receive payment directly from the financial service account, rather than from any intermediary. Such direct mapping may enable return processing. For example, where a good was purchased from a merchant during a purchase transaction involving a secure token, when the good is returned the payment made for the good may be returned directly to the financial service account by the merchant. Other examples are possible as well.

In some embodiments, the secure token may be a limited-use token. For example, the secure token may be a single-use token. The single-use token may be used for only a single purchase transaction with a merchant, such that subsequent purchase transactions require a new secure token. As another example, the secure token may be a time-limited token. The time-limited token may be used only within a specified period of time, such that purchase transactions occurring after the period of time has expired require a new secure token. As still another example, the secure token may be a merchant-specific token. The merchant-specific token may be used one or more times with a single merchant, but may not be used with other merchants, such that purchase transactions with another merchant require a new secure token. As yet another example, the secure token may be a money-limited token. The money-limited token may only be used for payments up to a prescribed amount, either individually or collectively. The secure token may take other forms as well.

In some embodiments, before generating the secure token, the browser extension server may provide to the computing device an offer to generate the secure token. The browser extension server may provide the offer through, for example, the browser extension application. In some embodiments, the offer may include, for example, an opportunity for a user of the computing device to select a financial service product or financial service account for which to create a secure token. The browser extension server may receive from the computing device an acceptance of the offer and, in response to receiving the acceptance, may generate the secure token. The browser extension server may receive the acceptance through, for example, the browser extension application as well.

The authentication request may be a request to authenticate the second computing device and/or a user of the second computing device. Alternatively or additionally, the authentication request may be a request to populate the payment field with the generated secure token. The authentication request may be included with, for example, an SMS message, and MMS message, an e-mail, a push notification, a voicemail message, or other communication.

In some embodiments, the authentication request may include, for example, instructions for the user and/or the second computing device to generate an authentication response. For example, the authentication request may prompt a user to input into the second computing device an authentication response, such as a password, an alphanumeric code, a personal identification number, a customer pattern, biometric data, an answer to a security question, and/or other personal information. The instructions may indicate that the authentication response should be input by the user through, for example, one or more of touch or text input, voice input, or another kind of input the second computing device may be configured to receive. As another example, the authentication request may prompt the second computing device to generate an authentication response, such as a hash or security token. The instructions may indicate that the authentication response should be generated by the second computing device based on, for example, device information and/or geo-location information. The authentication request may take other forms as well.

At step 408, in response to transmitting the authentication request, the browser extension server may receive, through the authentication application, an authentication response. In embodiments where the authentication request included instructions for the user and/or second computing device to generate an authentication response, for example, the authentication response may indicate that the instructions have been followed by the user operating the second computing device and/or the second computing device (e.g., by including the input and/or generated authentication response). Alternatively or additionally, in embodiments where the authentication request requests input from a user of the second computing, the authentication response may include an indication of the requested input (e.g., by including the input authentication response) by the second computing device.

The browser extension server may determine whether the authentication response satisfies the authentication request. For example, the browser extension may compare the authentication response with predetermined authentication criteria, a pre-generated authentication response, and/or a newly-generated authentication response. As another example, receipt of the authentication response may itself satisfy the authentication request (e.g., where the authentication response indicates that the instructions provided in the authentication request have been followed by the user and/or second computing device). The browser extension server may determine whether the authentication response satisfies the authentication request in other manners as well.

At step 410, in response to determining that the authentication response satisfies the authentication request, the browser extension server may, through the browser extension application, populate the payment field with the secure token. In some embodiments, the browser extension server may provide the secure token to the browser extension application, and the browser extension application may modify the web page to populate the payment field with the secure token. Alternatively, in some embodiments, the browser extension application may provide a pop-up notification or other feature from which a user of the computing device may copy the secure token. The browser extension server may populate the payment field with the secure token in other manners as well.

In some embodiments, the browser extension server may additionally receive an indication of personal information associated with the first computing device. The browser extension server may receive the indication of the personal information through, for example, the browser extension application. The personal information may include, for example, a name of a user associated with the financial service account, a shipping address, and/or a billing address. Other personal information is possible as well. In some embodiments, the browser extension server may detect one or more personal information fields in the web page, e.g., in the same manner in which the browser extension server detected the payment field in step 404. In response to detecting the personal information field(s), the browser extension server may populate the personal information field(s) with the personal information, e.g., in the same manner in which the browser extension server populated the payment field in step 408.

Figure 5:
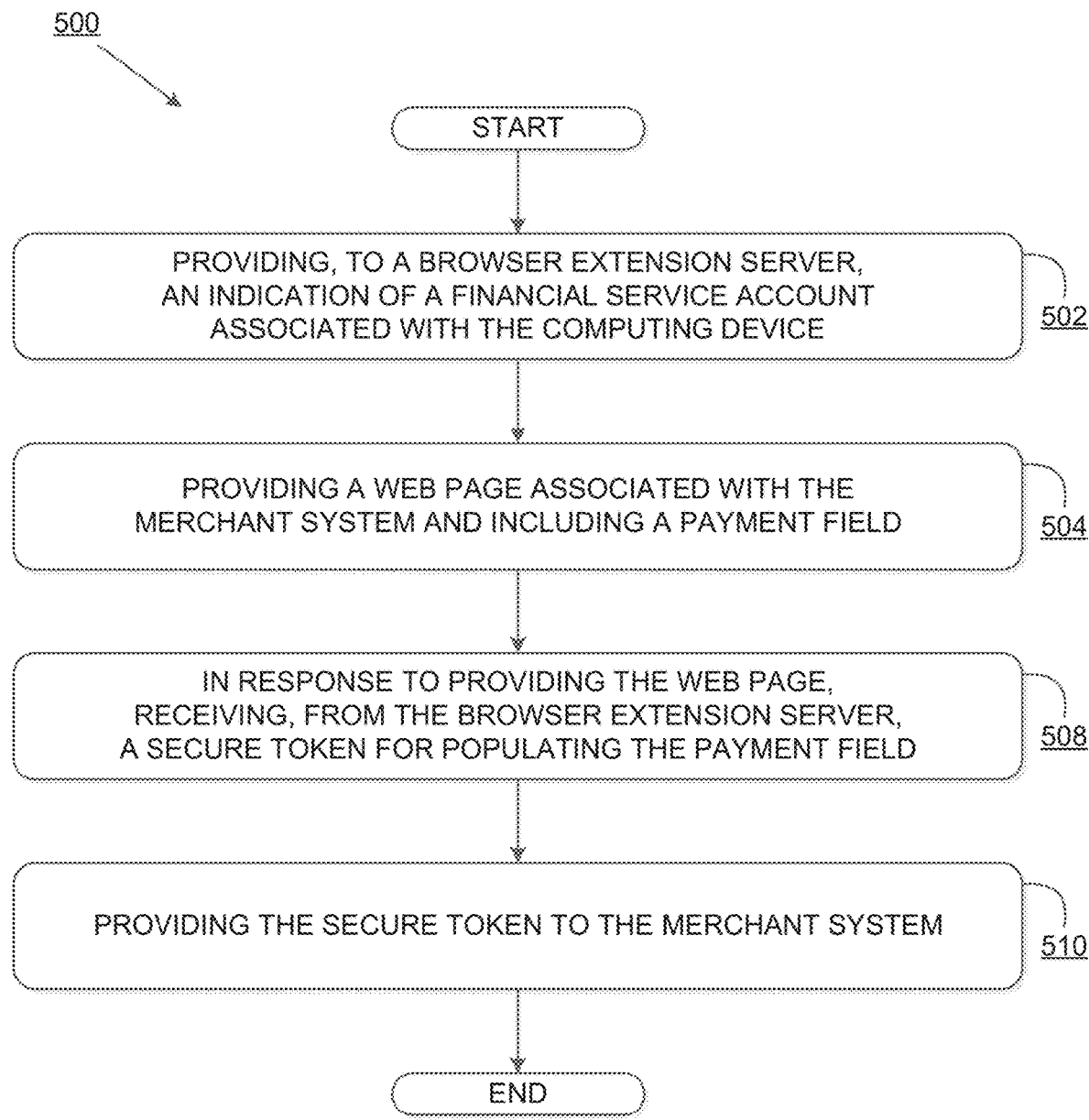
FIG. 5 is a flowchart of another browser extension process, consistent with disclosed embodiments.

FIG. 5 is a flowchart of another exemplary browser extension process 500, consistent with disclosed embodiments. Browser extension process 500 may be carried out at a computing device, such as first computing devices 102 and 300 described above.

As shown in FIG. 5, process 500 begins at step 502 with providing, to a browser extension server, an indication of a financial service account associated with the computing device. In some embodiments, the computing device may provide the indication through, for example, a browser extension application executed at the computing device, such as browser extension applications 106, 204, and 314 described above. The financial service account may be, for example, an account provided by a financial service provider, such as FSP system 112 described above. The financial service account may be one of, for example, a credit card account, a loan accounts, a checking account, a savings account, and a reward or loyalty program account. The financial service account may take other forms as well. The indication of the financial service account may be, for example, a PAN (e.g., a 16-digit PAN often printed on a financial service product), routing information, or other identifier of a financial service account. The indication of the financial service account may take other forms as well. In some embodiments, a user may operate the computing device to provide the indication such that the web browser application and/or browser extension server may subsequently coordinate with the financial service provider to generate and provide a secure token mapped to the underlying financial service account, as described below.

At step 504, the computing device may provide a web page that is associated with a merchant system (or other third-party system) and includes a payment field. In some embodiments, the computing device may provide the web page through, for example, a web browser application executed at the computing device, such as web browser applications 108 and 316 described above. Alternatively or additionally, the computing device may provide the web page through, for example, a display device, such as display device 304 described above.

The merchant system may be, for example, similar to merchant system 114 described above. In some embodiments, the merchant system may be associated with a merchant that provides goods or services. Further, in some embodiments, the web page may be an online retail web page through which a user of the computing device may engage in purchase transactions to purchase the merchant's goods or services. Other web pages are possible as well.

In some embodiments, the payment field may be a field in which information associated with a financial service product may be entered by a user of the computing device. For example, the payment field may be a field in which a PAN or other identifier may be entered. Other examples are possible as well. The payment field may be, for example, an input field in the script (e.g., HTML, XML) of the web page. In some embodiments, an input field identifier for the payment field may pertain to payment. The payment field may take other forms as well.

Browser extension process 500 continues at step 508 where, in response to providing the webpage, the computing device receives, from the browser extension server, a secure token for populating the payment field. In some embodiments, the computing device may receive the secure token through the browser extension application. The computing device may receive the secure token in other manners as well.

The secure token may be a generated identifier that maps back to an identifier of the financial service account, such as a PAN (e.g., a 16-digit PAN often printed on a financial service product) or other identifier. The secure token identifier may be, for example, a randomly generated identifier. Other secure tokens are possible as well.

In some embodiments, the secure token may be a limited-use token. For example, the secure token may be a single-use token. The single-use token may be used for only a single purchase transaction with a merchant, such that subsequent purchase transactions require a new secure token. As another example, the secure token may be a time-limited token. The time-limited token may be used only within a specified period of time, such purchase transactions occurring after the period of time has expired require a new secure token. As still another example, the secure token may be a merchant-specific token. The merchant-specific token may be used one or more times with a single merchant, but may not be used with other merchants, such that purchase transactions with another merchant require a new secure token. As yet another example, the secure token may be a money-limited token. The money-limited token may only be used for payments up to a prescribed amount, either individually or collectively. The secure token may take other forms as well.

In some embodiments, upon the computing device receiving the secure token, the browser extension application may populate the payment field with the secure token. For example, the browser extension application may modify the web page to populate the payment field with the secure token. Alternatively, in some embodiments, the browser extension application may provide a pop-up notification or other feature from which a user of the computing device may copy the secure token. The browser extension server may populate the payment field with the secure token in other manners as well.

In some embodiments, before the secure token is received, the computing device may receive from the browser extension server an offer to generate the secure token. The computing device may receive the offer through, for example, the browser extension application. In some embodiments, the offer may include, for example, an opportunity for a user of the computing device to select a financial service product or financial service account for which to create a secure token. The computing device may provide to the browser extension server an acceptance of the offer and, in response to providing the acceptance, may receive the secure token. The computing device may provide the acceptance through, for example, the browser extension application as well.

At step 519, the computing device may provide the secure token to the merchant system. In some embodiments, the computing device may provide the secure token to effectuate a purchase transaction in which a user of the computing device purchases a good or service from a merchant associated with the merchant server. In some embodiments, upon receiving the secure token, the merchant may seek authorization of the purchase transaction from a financial service provider by providing the secure token to an FSP system, such as FSP system 112 described above, associated with the financial service provider. The financial service provider may use the secure token to authenticate the computing device and authorize the purchase transaction. In some embodiments, additional authorization criteria may be used, such as a passcode or touch identification at the same or another computing device. Other authorizations are possible as well.

In some embodiments, the secure token may map directly (that is, without any intermediary) to the financial service account. In these embodiments, when the secure token is provided to the merchant system, the merchant system may receive payment directly from the financial service account, rather than from any intermediary. Such direct mapping may enable return processing. For example, where a good was purchased from the merchant during a purchase transaction involving a secure token, when the good is returned the payment made for the good may be returned directly to the financial service account by the merchant. Other examples are possible as well.

In some embodiments, the computing device may additionally provide, to the browser extension server, an indication of personal information associated with the computing device. The computing device may provide the indication of the personal information through, for example, the browser extension application. The personal information may include, for example, a name of a user associated with the financial service account, a shipping address, and/or a billing address. Other personal information is possible as well. In some embodiments, during a purchase transaction, the computing device may receive the personal information fields and populate personal information field(s) with the personal information, e.g., through the browser extension application. For example, the browser extension application may modify the web page to populate the personal information field(s) with the personal information. Alternatively, in some embodiments, the browser extension application may provide a pop-up notification or other feature from which a user of the computing device may copy the personal information. The browser extension server may populate the personal information field(s) with the personal information in other manners as well.

Figure 6A:
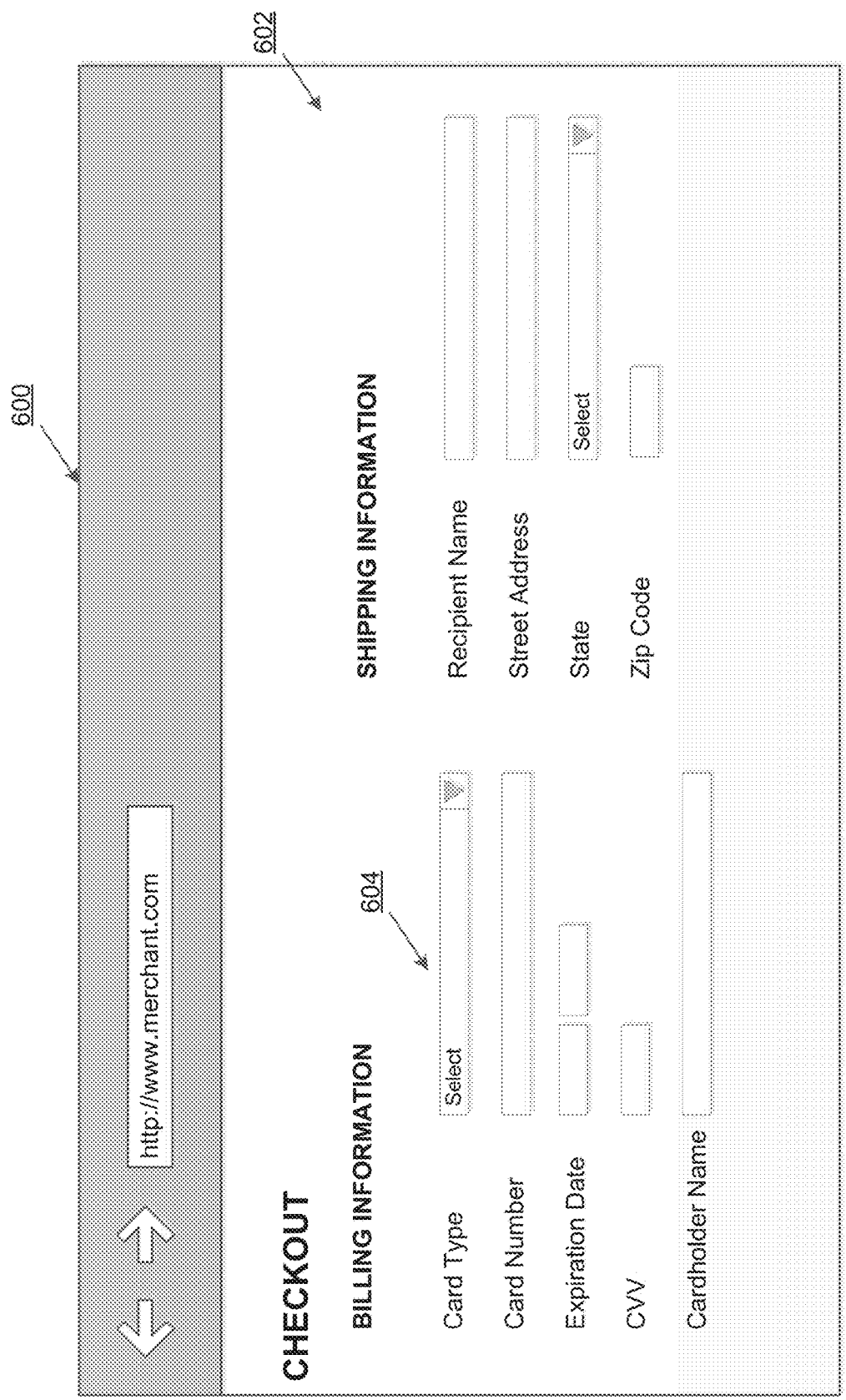
FIGS. 6A-E illustrate exemplary interfaces on computing devices, consistent with disclosed embodiments.

FIGS. 6A-E illustrate exemplary interfaces on computing devices, consistent with disclosed embodiments. As shown in FIG. 6A, a first computing device may execute a web browser application 600. The first computing device may be, for example, a desktop or laptop computer. In some embodiments, the first computing device may be similar to first computing devices 102 and 300 described above. Other first computing devices are possible as well.

Through the web browser application 600, a web page 602 may be provided. In some embodiments, web page 602 may be associated with a merchant. For example, web page 602 may be an online retail web page through which a user of the computing device may engage in a purchase transaction to purchase a good from the merchant.

In some embodiments, as shown in FIG. 6A, during a "Checkout" stage of the purchase transaction, a user of the first computing device may be prompted to enter "Billing Information" and "Shipping Information" into input fields on web page 602. For example, the user may be prompted to enter payment information into a payment fields 604, as shown. While certain payment and other input fields are shown, other payment and/or input fields are possible as well.

Figure 6B:
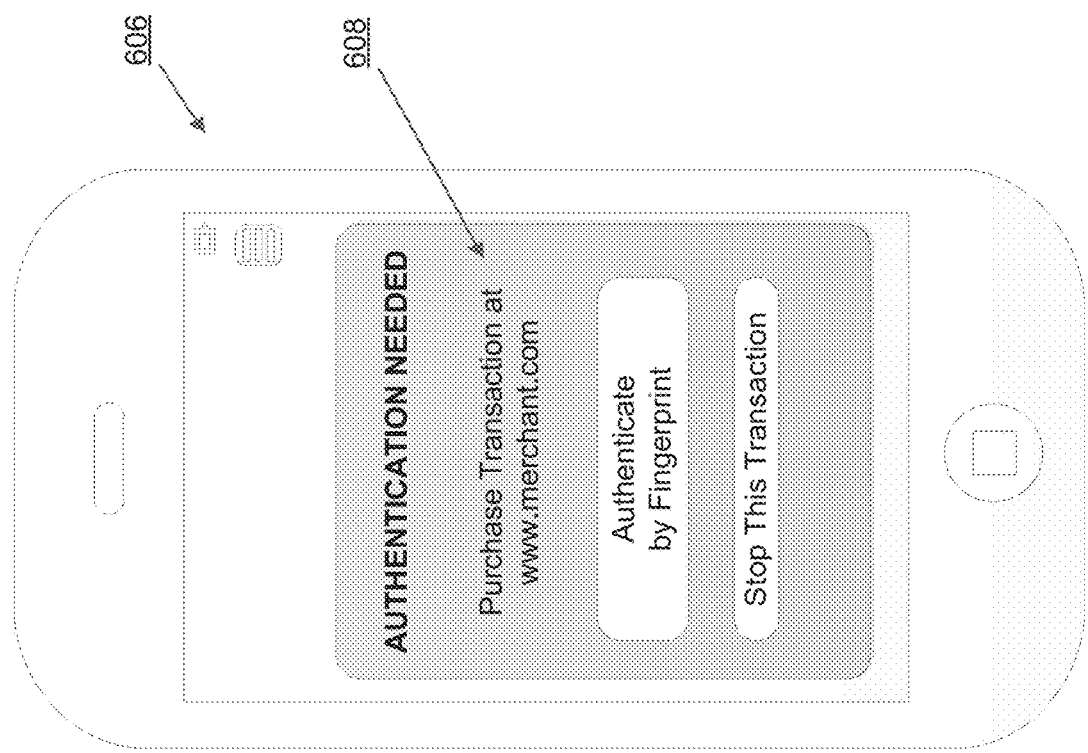

In some embodiments, a browser extension server and/or a browser extension application executed at the first computing device may detect payment fields 604. In response, the browser extension server may transmit an authentication request to a second computing device 606, as shown in FIG. 6B. Second computing device 606 may be, for example, a mobile device. In some embodiments, second computing device 606 may be similar to second computing devices 118 and 318 described above. Other second computing devices are possible as well.

Second computing device 606 may execute an authentication application 608 through which the authentication request may be received from the browser extension server. In some embodiments, the authentication request may include instructions for the user and/or second computing device 606 to generate an authentication response. For example, the authentication request may instruct the user to touch his or her finger to an input device included in the second computing device 606. Alternatively or additionally, in some embodiments, the authentication request may request input from a user of second computing device 606. For example, the authentication request may request that the user input biometric data. Other examples are possible as well.

Figure 6C:
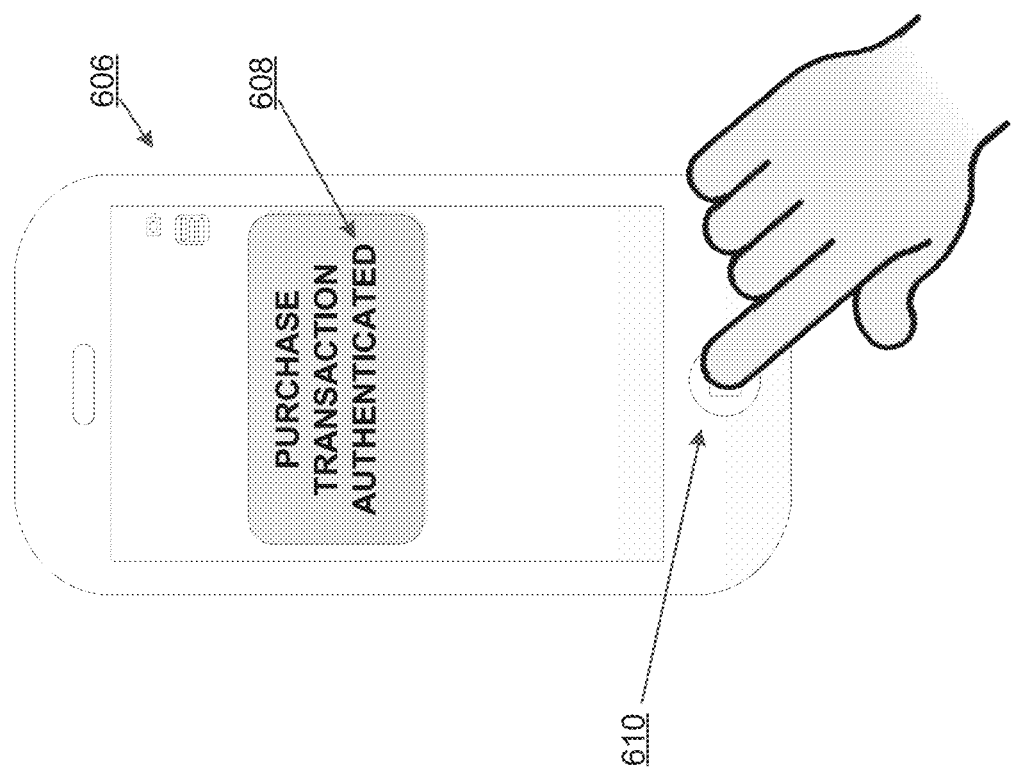

As shown in FIG. 6C, the user and/or second computing device 606 may generate an authentication response through authentication application 608. For example, as shown, the user may input biometric data by touching his or her finger to an input device 610 included in the second computing device 606. Other manners of authentication are possible as well, including, for instance, input of a password, an alphanumeric code, a personal identification number, a customer pattern, other forms of biometric data, an answer to a security question, and/or other personal information through, for example, one or more of touch or text input, voice input, or another kind of input, and/or o generation of a hash or security token based on, for example, device information and/or geo-location information. Authentication may take other forms as well.

Second computing device 606 may generate the authentication response for transmission to the browser extension server through authentication application 608. In some embodiments, the authentication response may indicate that the instructions provided in the authentication request have been followed by the user and/or second computing device 606. Alternatively or additionally, the authentication response may include an indication of the requested input. The authentication response may take other forms as well.

Second computing device 606 may transmit the authentication response to the browser extension server through authentication application 608. Upon receiving the authentication response, the browser extension server may determine whether the authentication response satisfies the authentication request. For example, the browser extension may compare the authentication response with predetermined authentication response criteria, a pre-generated authentication response, and/or a newly-generated authentication response. As another example, receipt of the authentication response may itself satisfy the authentication request (e.g., where the authentication response indicates that the instructions provided in the authentication request have been followed by the user the operating second computing device and/or second computing device). The browser extension server may determine whether the authentication response satisfies the authentication request in other manners as well.

Figure 6D:
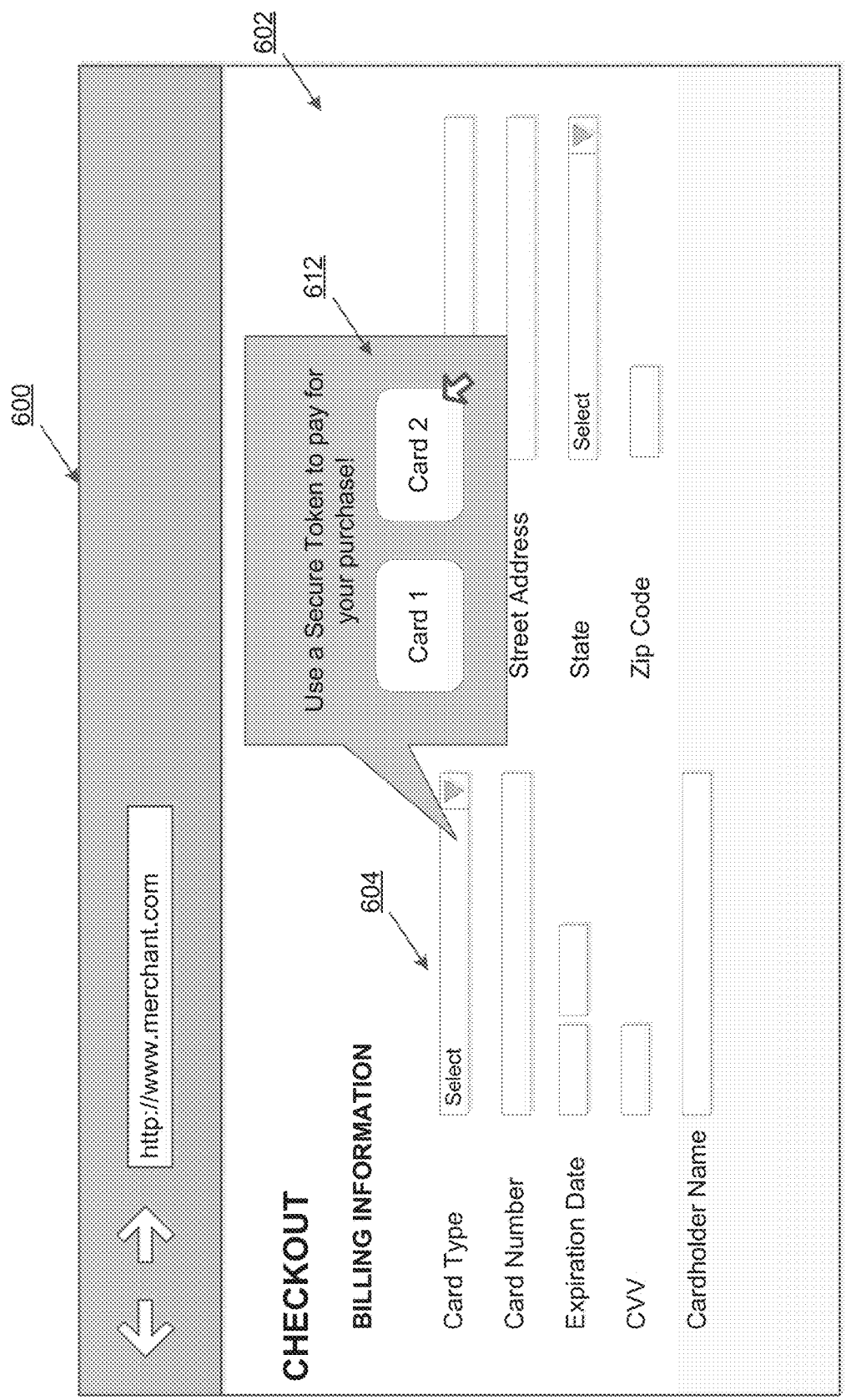

In response, the browser extension server and/or a browser extension application may provide to the user an offer to generate a secure token. For example, the browser extension application may provide a pop-up notification 612, as shown in FIG. 6D. The offer may be provided in other manners as well. In some embodiments, the offer may include, for example, an opportunity for a user of the first computing device to select a financial service product or financial service account for which to create a secure token, as shown. The financial service products or accounts provided may, for example, include a financial service product or account identified to the browser extension server through a provided identification, as described above in connection with steps 402 of browser extension process 400 and 502 of browser extension process 500. In some embodiments, in response to receiving an acceptance of the offer from the user, the browser extension server may generate a secure token. Alternatively, in some embodiments, the browser extension server and/or browser extension application may generate the secure token automatically, without providing an offer to or receiving an acceptance from the user. The secure token may be generated in other manners as well.

Figure 6E:
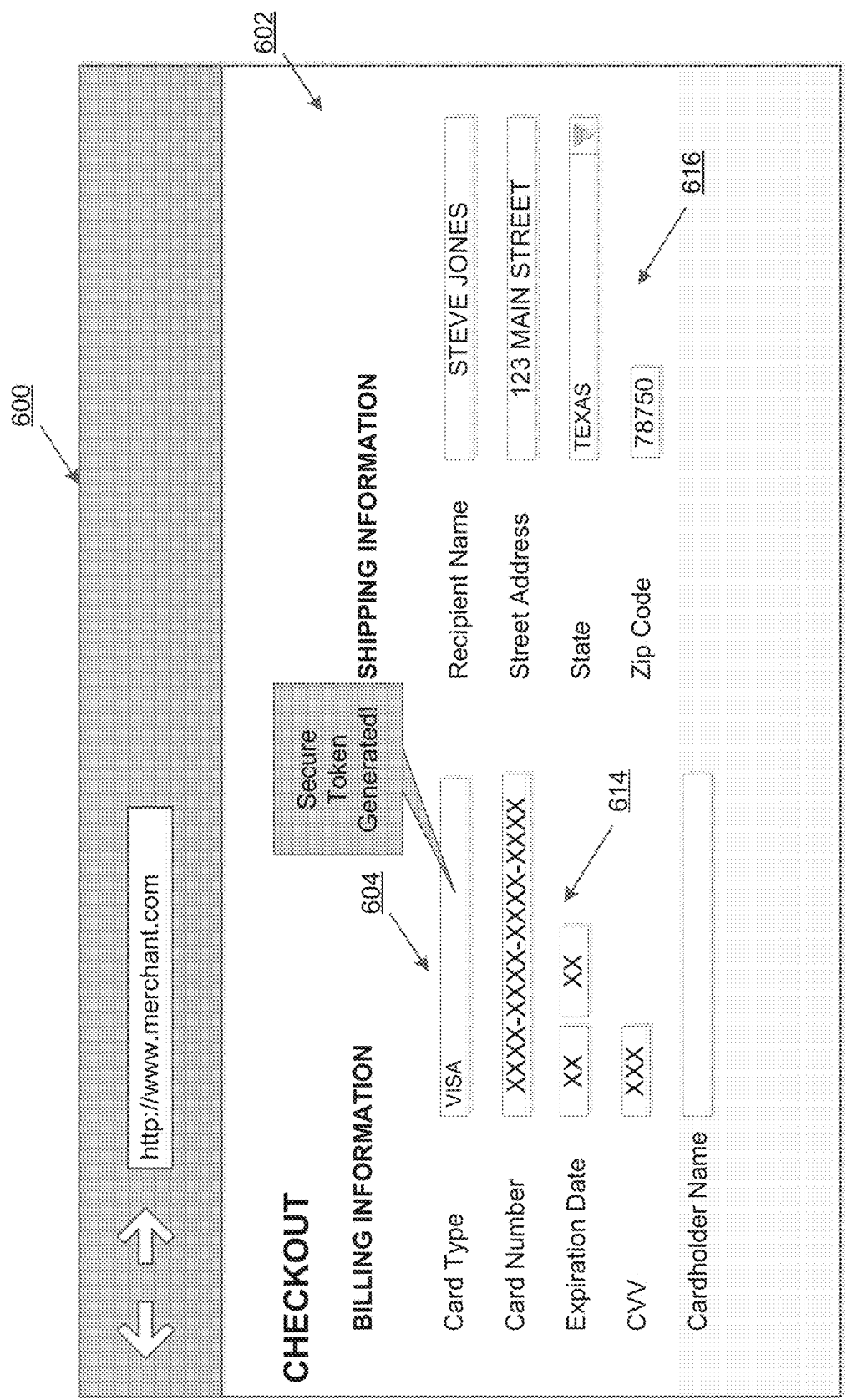

The secure token may be provided to the first computing device, e.g., through the browser extension application. As shown in FIG. 6E, in some embodiments, payment fields 604 in web page 602 may be populated with a secure token 614. For example, in some embodiments, the browser extension server may provide secure token 614 to the browser extension application, and the browser extension application may modify web page 602 to populate payment fields 604 with secure token 614. Alternatively, in some embodiments, the browser extension application may provide a pop-up notification or other feature from which a user of the computing device may copy secure token 614 into payment field 604. Payment fields 604 may be populated in other manners as well.

In some embodiments, the computing device may provide secure token 614 to effectuate a purchase transaction in which a user of the computing device purchases a good or service from the merchant providing web page 602. In some embodiments, upon receiving secure token 614, the merchant may seek authorization of the purchase transaction from a financial service provider by providing secure token 614 to an FSP system, such as FSP system 112 described above, associated with the financial service provider. The financial service provider may use secure token 614 to authenticate the computing device and authorize the purchase transaction.

In some embodiments, secure token 614 may be a merchant-specific token. For example, the token may be reusable in subsequent purchase transactions with the merchant but not usable at any other merchants. In some embodiments, the browser extension server may redetect, e.g., through the browser extension application, payment fields 604 in web page 602. For example, payment fields 604 may be redetected when, after the purchase transaction depicted in FIG. 6E, the user revisits web page 602 to engage in a subsequent purchase transaction. In some embodiments, in response to redetecting payment fields 604, the browser extension application may repopulate, e.g., through the browser extension application, payment fields 604 with secure token 614. The browser extension application may repopulate the payment fields 604 without, for example, regenerating secure token 614.

Alternatively or additionally, in some embodiments a user may establish a recurring payment to a merchant, such as a merchant providing a monthly service. Other merchants are possible as well. While secure token 614 may not be usable at any other merchants, secure token 614 may be repeatedly used at the merchant, thereby permitting the user to make the recurring payments.

In some embodiments, the computing device may additionally provide, e.g., through the browser extension application, an indication of personal information associated with the computing device. The personal information may include, for example, a recipient name and a shipping address, as shown in FIG. 6E. Other personal information is possible as well. In some embodiments, the browser extension server may detect one or more personal information fields 616 in the web page, e.g., in the same manner in which the browser extension server detected payment fields 604. In response to detecting the personal information field(s) 618, the browser extension server may populate personal information field(s) 618 with the personal information, e.g., in the same manner in which the browser extension server populated payment fields 604. The personal information field(s) may be populated in other manners as well.

While several example interfaces are shown in FIGS. 6A-E, it will be understood that the interfaces shown are merely examples and that other interfaces are possible as well. Moreover, while the first computing device described in connection with FIGS. 6A-E was depicted as a desktop or laptop computer, and the second computing device described in connection with FIGS. 6A-E was depicted as a mobile device, it will be understood that each of the first and second computing devices may take any number of forms, the same form, and/or different forms.

FIG. 7 is a flowchart of a browser extension message stream 700, consistent with disclosed embodiments. It will be understood that messages in browser extension message stream 700 are merely illustrative. Messages may be transmitted among the components and/or other components in other manners as well, and where a single message is shown, more messages are possible. The first computing device, second computing device, browser extension server, FSP system, and merchant system shown in FIG. 7 may be similar to, for example, first computing devices 102 and 300, second computing devices 118 and 318, browser extension servers 110 and 202, FSP system 112, and merchant system 114, respectively.

As shown, the first computing device may send a message 702 to the browser extension server. Message 702 may include, for example, an indication of a financial service account associated with the first computing device. The indication of the financial service account may be, for example, a PAN (e.g., a 16-digit PAN often printed on a financial service product), routing information, or other identifier of a financial service account. The indication of the financial service account may take other forms as well. In some embodiments, a user may operate the first computing device to provide the indication such that a web browser application and/or the browser extension server may subsequently coordinate with the FSP system to generate and provide a secure token mapped to the underlying financial service account, as described below.

Thereafter, the first computing device may send a message 704 to the browser extension server. Message 704 may indicate, for example, a payment field in a web page, such as an online retail web page through which a user of the first computing device may engage in a purchase transaction to purchase goods or services from a merchant associated with the merchant system.

Through messages 706 and 708, browser extension server and/or the FSP system (or other third-party system) may generate a secure token. The FSP system may, for example, be associated with a financial service provider that provides the financial service account associated with the first computing device.

With message 710, the browser extension server may transmit to the second computing device and authentication request. The authentication request may, for example, include instructions for generating an authentication response. Alternatively or additionally, the authentication request may request input from a user of the second computing device. The authentication request may take other forms as well.

In response to receiving message 710, the second computing device may send to the browser extension server an authentication response as message 712. The authentication response may, for example, indicate that the instructions included in the authentication request have been followed. Alternatively or additionally, the authentication response may include an indication of the input requested in the authentication request. The authentication response may take other forms as well.

With message 714, the browser extension server may provide the secure token to the computing device. In some embodiments, the payment field may be populated with the secure token.

The computing device may send the secure token to the merchant system (or other third-party system) through message 716. For example, the computing device may provide the secure token to effectuate a purchase transaction to purchase goods or services from the merchant associated with the merchant system.

To complete the purchase transaction, the merchant system and the FSP system may authorize the purchase transaction through messages 718 and 720. For example, the merchant system may provide the secure token to the FSP system with message 718, and the FSP system may provide an authorization and/or payment to the merchant system through message 720.

In some embodiments, the secure token may map directly (that is, without any intermediary) to the financial service account. In these embodiments, when the secure token is provided to the merchant, the merchant may receive payment directly from the financial service account, rather than from any intermediary. Such direct mapping may enable return processing. For example, where a good was purchased from a merchant during a purchase transaction involving a secure token, when the good is returned the payment made for the good may be returned directly to the financial service account by the merchant. Other examples are possible as well.

While the foregoing examples focused on a browser extension system for facilitating population of payment fields with secure tokens and/or personal information fields with personal information, in some embodiments the browser extension system may more generally be configured to detect features of a web page (e.g., by reviewing script of the web page) and, in response, provide pop-up notifications or other features to enhance a user's experience. For example, pop-up notifications may be provided that include information relating to the user's financial service account(s), financial service product(s), and/or information provided by one or more merchants, such as coupons, receipts, ratings, return policies, etc. Other features are possible as well.

In some embodiments, various features of the browser extension system may be activated, deactivated, and/or customized through a browser extension application control panel. For example, such a control panel may enable a user to provide indications of financial service accounts associated with the user and manage existing secure tokens. For instance, a user may use the control panel to deactivate an existing merchant-specific token. As another example, a user may raise or lower a prescribed limit on a money-limited token. Other examples are possible as well.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A method for providing a secure token by a browser extension application, comprising:
   detecting, via the browser extension application, a payment field in a webpage received at a computing device of a user;
   requesting, in response to detecting the payment field, an authentication response from the user;
   receiving, from a browser extension server and in response to the user being authenticated based on the authentication response, the token mapped to a determined financial service account associated with the user; and
   populating, by the browser extension application and in response to receiving the token, the payment field in the webpage with the token, wherein the token is configured to enable a purchase transaction with a merchant via the webpage;
   wherein:
      the browser extension server is a system associated with the financial service account; and
      a provider of the financial service account is configured to send a communication authorizing the purchase transaction.

2. The method of claim 1, wherein:
   requesting the authentication comprises providing instructions for generating the authentication response; and
   the authentication response indicates that the instructions have been followed.

3. The method of claim 1, wherein:
the computing device of the user comprises a first computing device of the user; and
requesting the authentication response comprises providing, to a second computing device of the user, instructions for generating the authentication response.

4. The method of claim 1, wherein:
the authentication response is received from the user by a second computing device; and
the browser extension server is configured to:
receive, from the second computing device, the authentication response;
authenticate the user based on the authentication response; and
generate the token after authenticating the user.

5. A method for providing a secure token by a browser extension application comprising:
detecting, via the browser extension application at a computing device associated with a user, one or more fields in a webpage;
requesting, in response to detecting the one or more fields, an authentication response from the user;
populating, by the browser extension application and in response to authenticating the user based on the authentication response, the one or more fields in the webpage with a respective one or more secure tokens, the one or more secure tokens being received from a browser extension server and mapped to a determined financial service account associated with the user, wherein the one or more secure tokens are configured to enable a purchase transaction with a merchant via the webpage;
wherein:
the browser extension server is a system associated with the financial service account; and
a provider of the financial service account is configured to send a communication authorizing the purchase transaction.

6. The method of claim 5, wherein the one or more secure tokens correspond to credit card data.

7. The method of claim 5, wherein a first one of the secure tokens corresponds to a credit card number, a second one of the secure tokens corresponds to an expiration date, and a third one of the secure tokens corresponds to a credit card verification value.

8. The method of claim 5, wherein the financial service account is determined based on receiving a selection of a financial service account type from the user.

9. The method of claim 8, wherein the financial service account type is one of a credit card or a bank account.

10. The method of claim 8, wherein choices for selecting the financial service account type are provided via an interface window associated with the browser extension application and displayed overlaying the webpage.

11. The method of claim 5, wherein populating the one or more fields with a respective one or more secure tokens comprises:
requesting the one or more secure tokens from a browser extension server; and
receiving the one or more secure tokens from the browser extension server.

12. The method of claim 11, wherein the browser extension server is configured to:
generate the one or more secure tokens; and
map the generated one or more secure tokens to the financial service account.

13. The method of claim 12, wherein populating the one or more fields with a respective one or more secure tokens comprises:
providing, via the browser extension application, an offer to receive the one or more secure tokens;
transmitting a confirmation of the offer to the browser extension server; and
receiving, from the browser extension server, the one or more secure tokens.

14. The method of claim 13, wherein the browser extension server is configured to generate the one or more secure tokens upon receiving the confirmation.

15. The method of claim 13, wherein providing an offer to receive the one or more secure tokens comprises providing, via the browser extension application, the user with a selection of a financial service account for which to create the one or more secure tokens.

16. The method of claim 5, wherein:
the authentication request comprises instructions for generating the authentication response; and
the authentication response indicates that the instructions have been followed.

17. A system comprising:
a memory for storing instructions; and
one or more processors for executing the instructions to perform operations comprising:
receiving a token request, from a first computing device, in response to receipt of an indication of a payment field of a webpage being detected at the first computing device;
authenticating a user of the first computing device in response to receiving the request for the token;
generating a secure token associated with a financial service account of the user of the first computing device; and
providing, in response to the request, the token to the first computing device;
wherein:
a browser extension application of the computing device is configured to populate the payment field with the token; and
a provider of the financial service account is configured to communicate with a merchant associated with the webpage to authorize a purchase transaction.

18. The system of claim 17, wherein the authenticating further comprises:
transmitting, in response to receiving the token request, an authentication request to a second computing device;
receiving an authentication response from the second computing device; and
determining that the authentication response satisfies the authentication request, and wherein generating the token is done after determining that the authentication response satisfies the authentication request.

19. The system of claim 18, wherein:
the authentication request comprises instructions for generating the authentication response; and
the authentication response indicates that the instructions have been followed.

20. The system of claim 18, wherein:
an authentication application installed on the second computing device is used for receiving the authentication response, and
the response comprises geo-location information.

* * * * *